July 21, 1942.  G. P. BOSOMWORTH  2,290,618
SLIPPAGE RECORDER
Filed Oct. 4, 1939　　7 Sheets-Sheet 1

Fig. 1.

INVENTOR
George P. Bosomworth
BY
ATTORNEYS

July 21, 1942.　　　G. P. BOSOMWORTH　　　2,290,618
SLIPPAGE RECORDER
Filed Oct. 4, 1939　　　7 Sheets-Sheet 3

INVENTOR
George P. Bosomworth
BY
Ely & Frye
ATTORNEYS

July 21, 1942.  G. P. BOSOMWORTH  2,290,618
SLIPPAGE RECORDER
Filed Oct. 4, 1939     7 Sheets-Sheet 4

INVENTOR
George P. Bosomworth
BY
ATTORNEYS

Fig. 7.

July 21, 1942.  G. P. BOSOMWORTH  2,290,618
SLIPPAGE RECORDER
Filed Oct. 4, 1939  7 Sheets-Sheet 7

INVENTOR
George P. Bosomworth
BY Ely & Frye
ATTORNEYS

Patented July 21, 1942

2,290,618

UNITED STATES PATENT OFFICE 2,290,618

SLIPPAGE RECORDER

George P. Bosomworth, Akron, Ohio, assignor to The Firestone Tire & Rubber Company, Akron, Ohio, a corporation of Ohio Application October 4, 1939, Serial No. 297,914

11 Claims. (Cl. 73—51)

This invention relates to slippage recorders, and more especially it relates to instruments for graphically recording the slippage or relative movement between two frictionally engaged surfaces. The invention is of utility in a number of situations, as for example, for recording the relative movement between a conveyor belt and a continuous length of material being fed onto one end thereof, or for recording the slippage between a driven vehicle wheel and the surface over which it is being driven.

Solely for illustrative purposes, the invention is shown in the accompanying drawings in its adaptation to the recording of slippage between a tractor tire and the roadway or ground over which the tractor is being driven. Such slippage represents a loss of traction and, in the last analysis, an economic waste. It is common practice to endeavor to reduce slippage loss by the provision of improved traction elements on the tires with which a tractor is equipped, so that by the use of the invention it is possible to obtain comparative data on the tractive qualities of various tire designs.

The chief objects of the invention are to provide a slippage recorder of the character mentioned that will be relatively simple in its construction and operation; that will provide a graphic record of results obtained; and that operates from the wheel rather than from the tire being tested. Other objects will be manifest as the specification proceeds.

Figure 1:
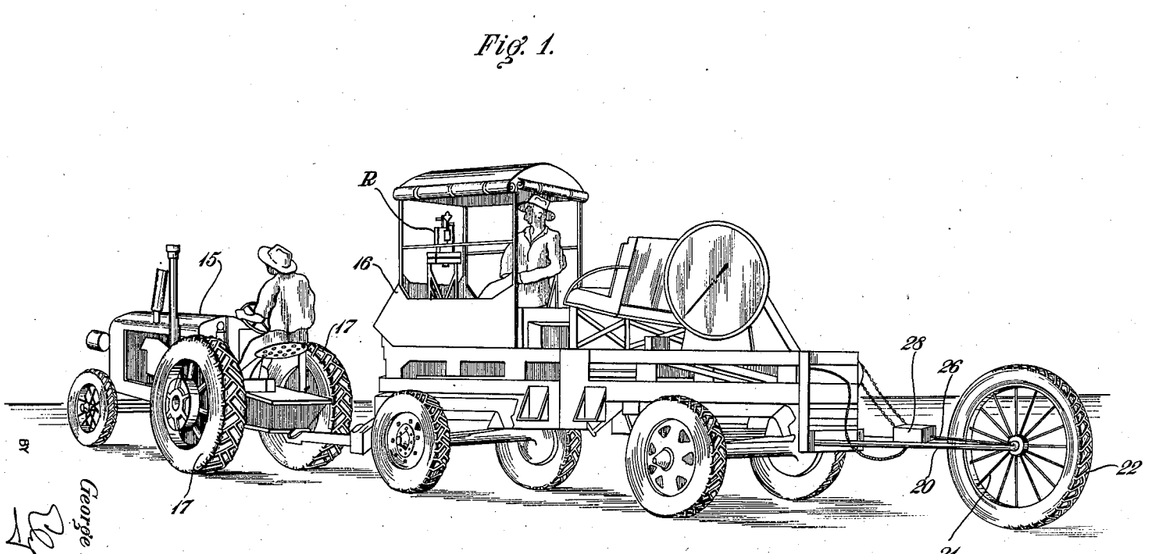
Figure 1 is a perspective view of a tractor and a trailer attached thereto, and the improved slippage recorder operatively associated therewith to record the slippage of one of the tractor tires.

Referring first to Figure 1 of the drawings, there is shown a motor propelled tractor 15 that is drawing a wheeled trailer 16 hitched to the rear thereof. The tractor is of the type that has four wheels whereof the two rear wheels are power-driven, said wheels being provided with respective pneumatic tires 17. It is the function of the apparatus constituting the subject matter of this invention to measure the slippage between the tires 17 and the ground over which they travel to the end that the tractive value of the lugs or characters on the tread of the tires may be determined.

Swiveled to the rear end of the trailer 16 is a frame 20 that is capable of oscillating movement in a vertical plane, and journaled in said frame is a wheel 21 equipped with a pneumatic tire 22. The oscillating feature of the frame 20 enables the tire 22 to maintain contact with the ground or roadway at all times, and since no driving torque is applied to the wheel 21, there will be no slippage of the tire 22 upon the ground or roadway. Preferably the frame 20 is so constructed that the tire 22 is laterally offset with relation to the centerline of the tractor and trailer and travels in the track of one of the tires 17, being thus subject to the same irregularities of the roadway as the latter.

Figure 2:
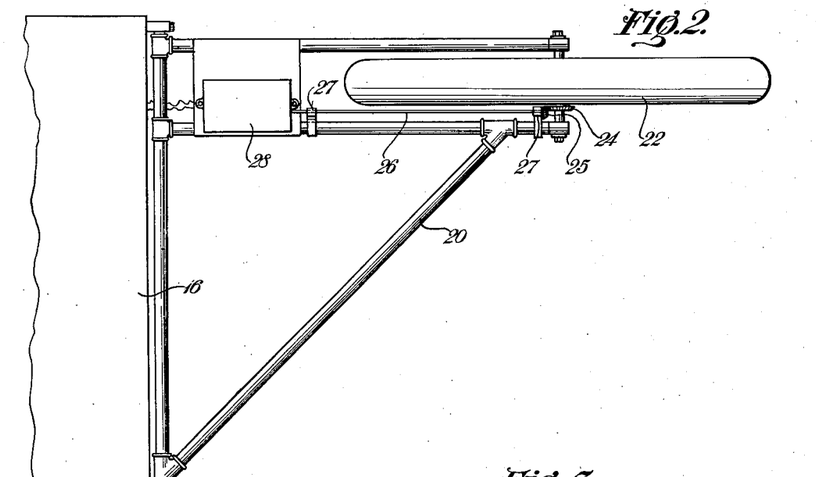
Figure 2 is a plan view of a fifth wheel attached to the rear end of the trailer.
Figure 3:
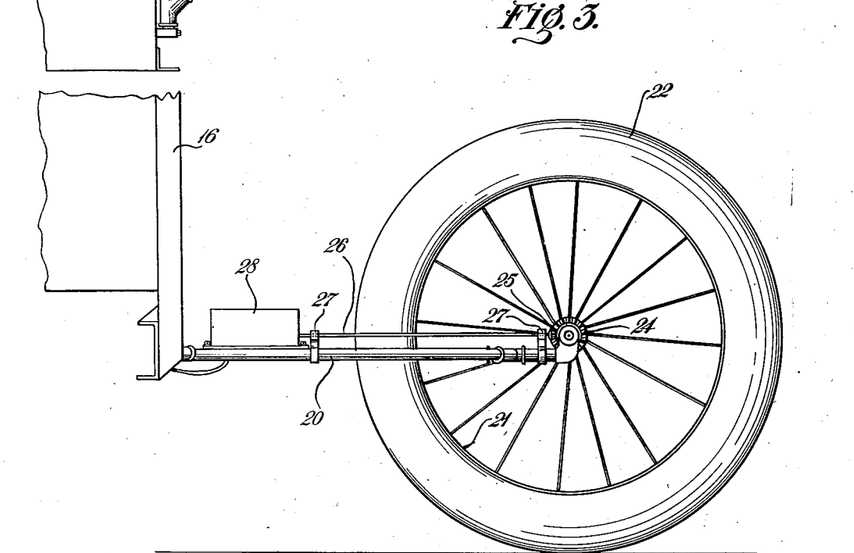
Figure 3 is a side elevation of the structure shown in Figure 2.
Figure 4:
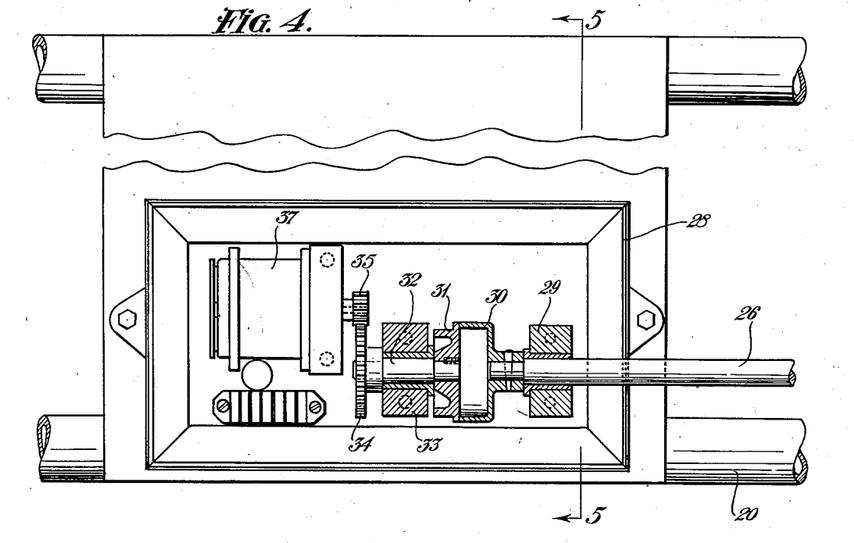
Figure 4 is a plan view of a housing carried by the framework of the fifth wheel structure, the cover of said housing being removed to show therein one unit of a pair of self-synchronizing motors.
Figure 5:
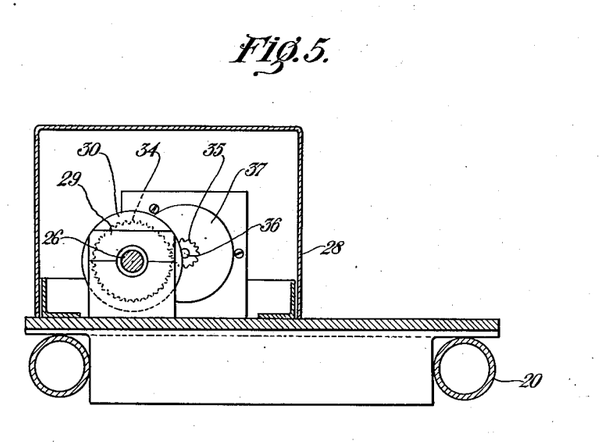
Figure 5 is a section on the line 5—5 of Figure 4.

The hub of the wheel 21 is provided with a bevel gear 24, Figures 2 and 3, and meshed with said gear is a bevel pinion 25 carried upon one end of a shaft 26, the latter being journaled in a pair of bearing brackets 27, 27 carried by the frame 20. The other end of shaft 26 extends into a box or housing 28 that is supported upon framework 29, forwardly of the wheel 21, said shaft being supported by a journal bearing 29 therein and having its end portion connected to one element 30 of a "free-wheeling" clutch of the usual or preferred type. The other element 31 of said clutch is mounted upon the adjacent end of a short shaft 32 that is in axial alignment with shaft 26, and is journaled in a suitable bearing 33. At its end remote from clutch element 31 the shaft 32 is provided with a gear 34 that is meshed with a pinion 35 mounted upon the rotor shaft 36 of a motor 37. The latter is one of a pair of self-synchronizing motors of the type marketed under the trade name of "Autosyn," and are provided for the purpose of remote control. They operate on the principle of electrical balance, which causes the synchronous motors, whose fields are excited from the same A. C. source of power, to assume the same geometrical position. The location and function of the second synchronous motor presently will be described. The arrangement is such that the rotating wheel 21 drives the motor 37 through the agency of shaft 26, clutch 30, 31, gear 34, and pinion 35 when the tractor 15 and trailer 16 are moving forwardly, the clutch preventing the driving of the motor when the truck and trailer are moving rearwardly. From the foregoing it will be apparent that the rotary speed of the motor 37 is in direct ratio to the speed of rotation of the wheel 21 at all times and at all speeds of the trailer and tractor.

The recording instrument of the apparatus for convenience may be mounted upon the trailer 16, as shown in Figure 1. Said instrument is designated as a whole by the character R, and is shown in detail in Figures 6 to 9 inclusive. The recording instrument comprises a suitable base plate 40 upon which is carried the framework 41 of the instrument. Mounted at the top of said framework is an electric motor 42 that is arranged on a vertical axis, and which drives a reduction gear device (not shown) mounted in a casing 43 below said motor. Said reduction gear device drives two vertical shafts 44, 45, Figure 6, that are driven in opposite directions and which project below the casing 43, said shafts being provided with respective gears 46, 47 that are positioned in different horizontal planes, which planes are spaced apart from each other. The motor 42 is driven by means of a standard 6 volt storage battery 48, Figure 13, which battery may be carried at any convenient place in the trailer 16. There is a control switch 49 in the circuit of the motor 42 and battery 48, and speed of the motor is controlled by a rheostat 50, the latter being enclosed in a casing 51 on the framework 41 and provided with an adjusting knob 52 on the exterior of its casing.

Figures 6, 6A:
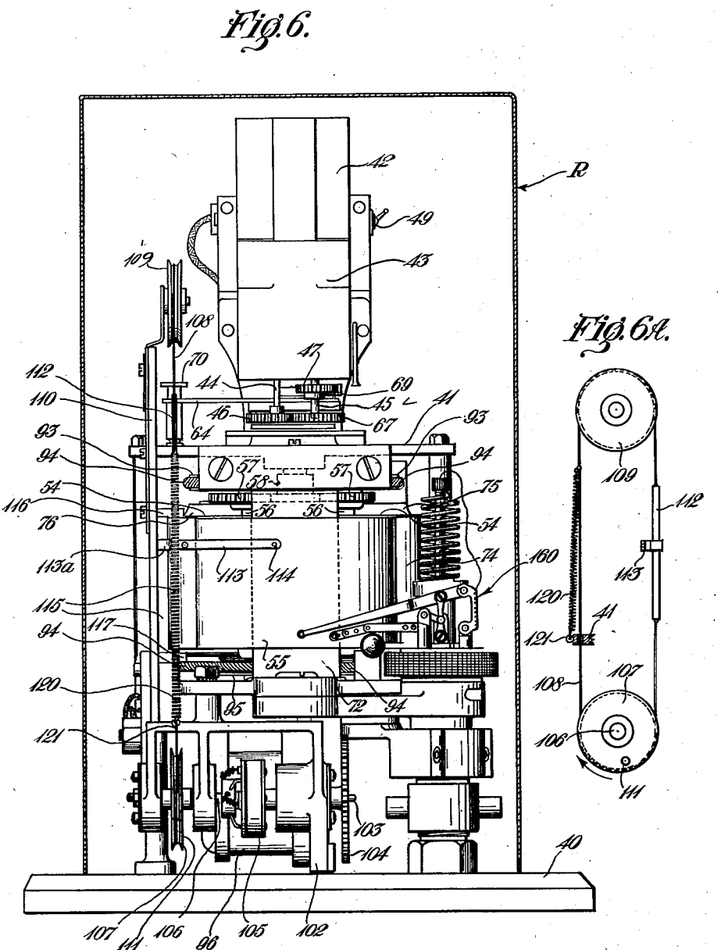
Figure 6 is a front elevation of the recording instrument of the apparatus.
Figure 6A is an isolated elevational detail, on a smaller scale, of the mechanism immediately connected to the recording finger of the device for operating the same.
Figure 9:
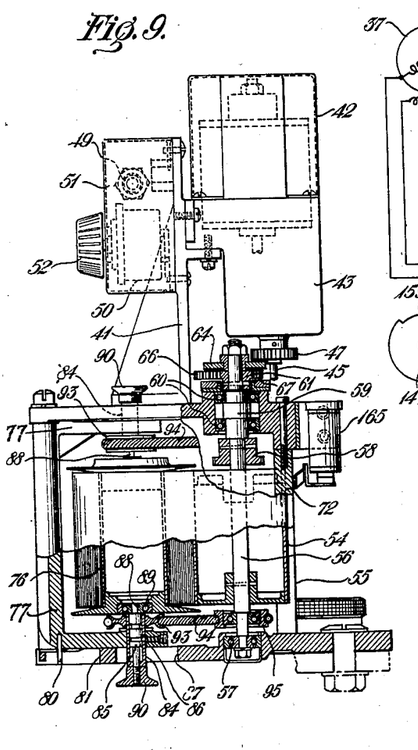
Figure 9 is a side elevation of the recording instrument as viewed from the left of Figure 6, parts being broken away and in section.

The function of the motor 42 is to drive a pair of spools 54, 54 about which a recording chart 55 passes, the rotation of said spools moving said chart longitudinally in a manner subsequently to be explained. The spools 54 are parallel and are positioned below the motor and the reduction gear device. They are mounted upon respective vertical shafts 56 that are journaled at their opposite ends in suitable bearings, such as the bearing 57, Figure 9, said bearings being supported in the framework 41. Adjacent their upper bearings, above the spools 54, each shaft 56 is provided with a gear 57, which gears are in mesh with an intermediately positioned gear 58. As is best shown in Figure 9, the gear 58 is mounted upon the lower end of a short vertical shaft 59 that is journaled intermediate its ends in bearings 60 that are mounted in framework 41, the upper end portion of the shaft being provided with a gear 61.

Figure 8:
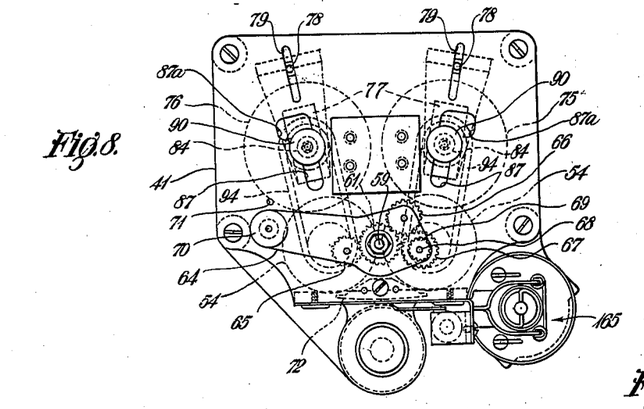
Figure 8 is a section on the line 8—8 of Figure 7.

Also pivotally mounted upon the upper end portion of shaft 59, for angular movement in a horizontal plane, is a lever 64, which lever is disposed above the gear 61. Rotatably mounted upon the under side of lever 64 is a pinion 65, Figure 8, that is meshed with gear 61. Also mounted upon the under side of lever 64, remote from pinion 65, is a second pinion 66, the latter being meshed with gear 61, and also meshed with a gear 67. The gear 67 is carried upon the lower end of a short vertical shaft 68 that is journaled in lever 64, said shaft extending through said lever and being provided with a relatively small pinion 69 on its upper end. The lever 64 is movable angularly about the shaft 59, and has two alternative positions, in one of which positions it is shown in Figure 8. The said lever carries a spring pressed bolt that is operated by the knob 70 on the free end of the lever, said bolt being insertable in apertures, such as the aperture 71, Figure 8, for retaining the lever in its alternative positions. When the lever is in the position shown in Figure 8, the pinion 65 is in mesh with the driving gear 46, and the spools 54 are driven thereby. When the lever is in its alternative position, the pinion 69 is in mesh with driving gear 47 with the result that the spools 54 are driven in the same direction as previously, but at determinately slower speed. The arrangement is such that the feed of the chart 55 may be correlated with the speed of the tractor 15. A backing plate 72 is mounted in front of the crevice between the spools 54, being secured at top and bottom to the framework 41. The chart 55 passes over said backing plate 72 in moving from one spool 54 to the other, and thereby is given lateral support to facilitate the scribing of a line record on the chart.

The spools 54 serve only to drive and guide the chart 55, the latter being initially in a roll 74 that is mounted upon a supply-spool 75, and being withdrawn from the latter and rewound upon a re-wind spool 76, after passing across the backing plate 72. The spools 75, 76 are disposed rearwardly of the spools 54, and are carried by respective C-shaped brackets 77, 77, that are of identical construction. Each of the brackets 77 is positioned between parallel plates or shelves constituting a part of the framework 41, and is slidably mounted so as to enable it to be urged in the direction of a spool 54 for a purpose presently to be explained. For guiding the brackets 77 during such sliding movement, each is provided at its top with an upwardly projecting pin 78, Figure 8, that is engaged in a slot 79 in the upper parallel plate aforementioned. In like manner the bottom of each bracket is provided with a downwardly projecting pin 80, Figure 9, engaged in a slot 81 in the lower parallel plate.

The spools 75, 76 are removably mounted in the brackets 77 so as to be replaceable with fresh supply and rewind spools whenever the chart 55 is completely wound upon the latter. To this end both laterally extending arms of each of said brackets has a sleeve 84 fixedly mounted therein, the sleeves of each bracket being axially aligned. As shown in Figure 9, each sleeve has an axially movable spindle 85 mounted therein, which spindle is circumferentially grooved at axially spaced apart points to receive a spring-backed detent 86 that serves to hold the spindle in one of two alternative positions. The outer end portion of each sleeve 84 projects beyond the bracket and extends through a slot 87 in the framework plate, said slot being parallel to and in alignment with a slot 79 or 81. The inner end of each spindle 85 is of reduced size, as shown at 88, and is insertable into an axial bearing 89 carried at one end of the spool 75 or 76. The outer end of each spindle 85 is provided with a knob 90 that may be grasped to pull the spindle axially, whereby its reduced inner end portion may be withdrawn from the bearing 89 of the spool, thus enabling the spool to be removed for the purpose previously set forth. Fixedly mounted upon each sleeve 84, above and below the spools 75, 76, are grooved sheaves 93, 93, about which are trained respective endless belts 94 consisting of helically coiled spring wire, said belts also being trained about respective sheaves 95 carried by the adjacent shafts 56, above and below the spools 54. The spring belts 94 serve to urge the spools 75, 76 against the driven spools 54, so that rotation of the latter will drive said spools 75, 76. A friction brake 75a, Figure 7, engages the lower end of the spool 75 to retard rotation of the same and thus to assure that the chart 55 will be withdrawn from the supply roll 74 thereon under sufficient tension to cause it to lie flat against the backing plate 72. The slots 87 are formed at their ends remote from the spools 54 with respective laterally offset portions 87a, Figure 8, into which the sleeves 84 may be moved while the spools 75, 76 are being removed from the device, upon occasion, as when a completed chart is being removed and a new supply roll 74 of chart material is being placed in the device.

Figure 13:
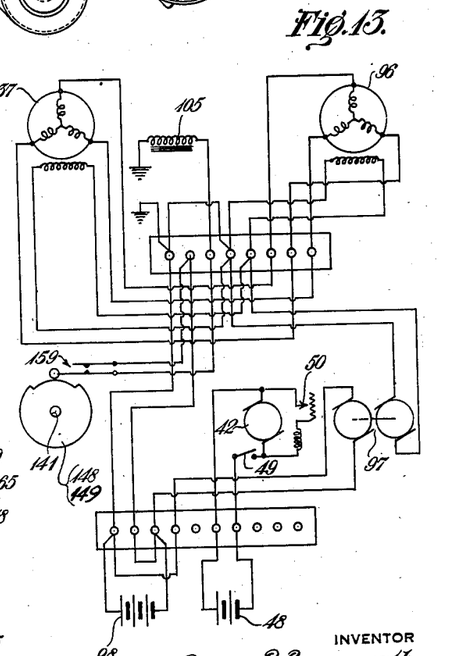
Figure 13 is a wiring diagram of the slippage recording apparatus.

Mounted upon the base plate 40 is a self-synchronizing motor 96, which is the "receiving" motor of the self-synchronizing motor 37 hereinbefore described. The motors 37, 96 are electrically connected to each other in the usual manner, as shown in Figure 13, and are excited by the same A. C. source of power, namely, a rotary converter 97, the latter being driven by a heavy duty storage battery 98, Figure 13. The rotary converter 97 and storage battery 98 are of standard construction and need no further illustration or description. They may be installed at any convenient place in the trailer 16. The arrangement is such that the rotors of the synchronous motors assume the same geometric positions at all times.

The shaft of the motor 96 is provided with a gear 100 that is meshed with an idler pinion 101 that is suitably journaled in a bearing bracket 102 carried by the framework 41. Also journaled in said bearing bracket 102 is a short shaft 103, one end of which carries a gear 104 that is meshed with pinion 101, the gear 104 being considerably larger than gear 100 to provide substantial speed reduction between the motor 96 and shaft 103. The other end of shaft 103 is connected to one element of a magnetic clutch 105, the other element of which is carried by a shaft 106 that is axially aligned with shaft 103 and also carried in the bearing bracket 102. The shaft 106 carries a grooved pulley 107 about which is trained a narrow belt 108 of wire or strong cord, said belt also passing over another pulley 109 that is mounted at an elevated position beside the gear casing 43, said pulley 109 being journaled upon an upright bracket 110, Figure 6, carried by the framework 41. The belt 108 is fixedly secured to the pulley 107 by means of a set screw 111, thereby obviating any possibility of slippage therebetween. One reach of the belt 108, (the far reach as viewed in Figure 6) has a metal rod 112 interposed therein, and fixedly secured to said rod is a laterally projecting recording finger 113 that extends in front of the chart 55, the free end of said finger overlying the backing plate 72 and being provided with any suitable scribing device, such as a pen indicated at 114, Figure 6. For holding the pen firmly against the chart, the finger 113 is formed integrally with an extension 113a that extends in the opposite direction from the rod 112 and slidingly bears against a plane vertical guide bar 115 that is carried by the bracket 110, said guide bar having lateral projections 116, 117 at top and bottom thereof that are engageable by the finger-extension 113a, and which constitute stops to limit the upward and downward movement of the finger. The near reach of the belt 108 extends through an aperture 119, Figure 6A, in the framework 41, and is connected to the upper end of a tension spring 120, the lower end of the latter being connected to a fixed point 121 on said framework.

Figure 7:
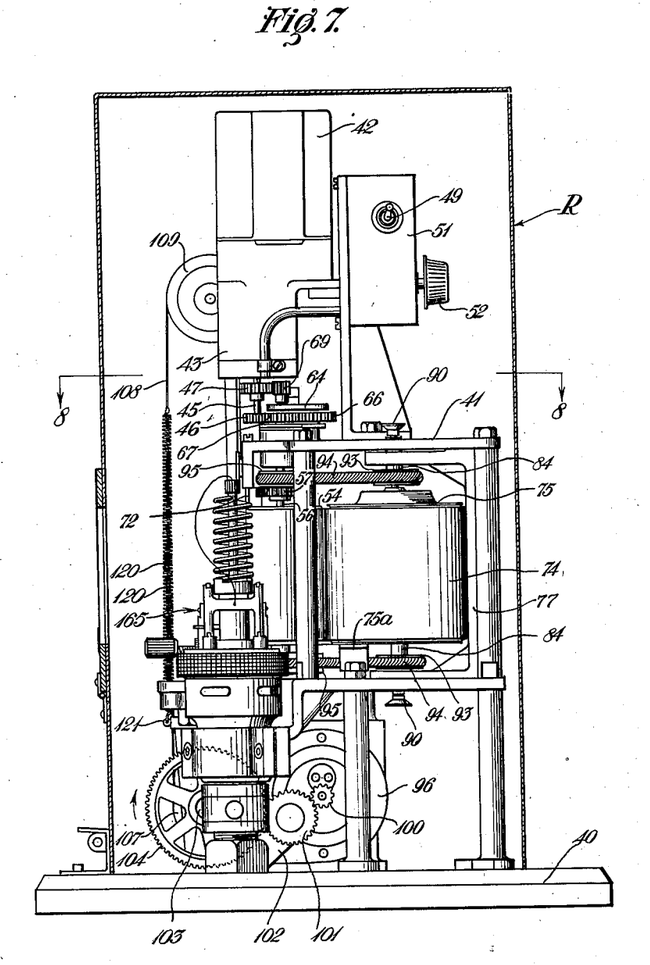
Figure 7 is a side elevation thereof as viewed from the right of Figure 6.

The arrangement is such that the constantly driven motor 96 drives the gear 104 and shaft 103 in the direction indicated by the arrow in Figure 7, thereby driving the shaft 106 and pulley 107 through the agency of the normally closed magnetic clutch 105, with the result that the rod 112 and recording finger 113 are moved downwardly against the tension of the spring 120, and the pen on said finger scribes a substantially vertical line on the slowly moving chart 55. Opening of the magnetic clutch 105 disengages driven shaft 106 from the driving shaft 103, thereby enabling spring 120 to reverse the movement of the belt 108 and pulley 107, and to restore the finger 113 to elevated position at the top of chart 55. Opening of the magnetic clutch 105 is effected periodically and automatically through the agency of a normally closed timer switch in the electrical circuit of the said clutch, said switch being operated by the drive of the tractor 15.

Figure 10:
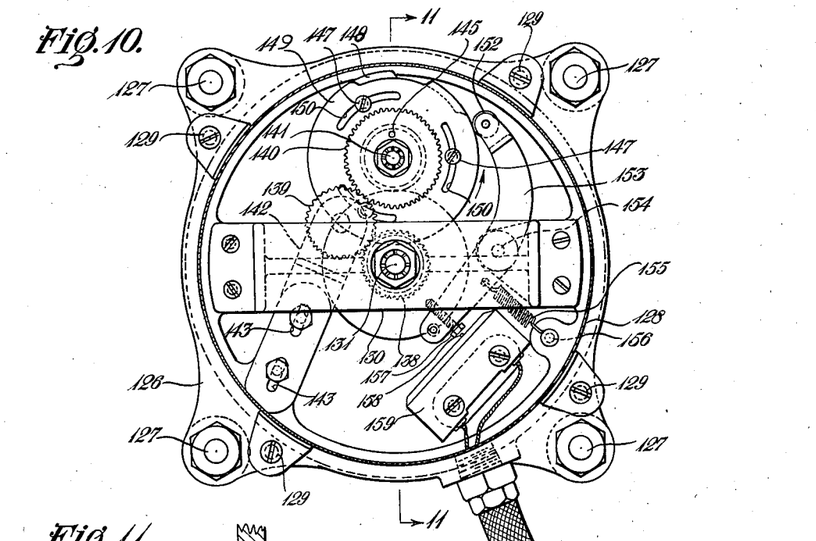
Figure 10 is a section on the line 10—10 of Figure 11 showing a switch mechanism.
Figure 11:
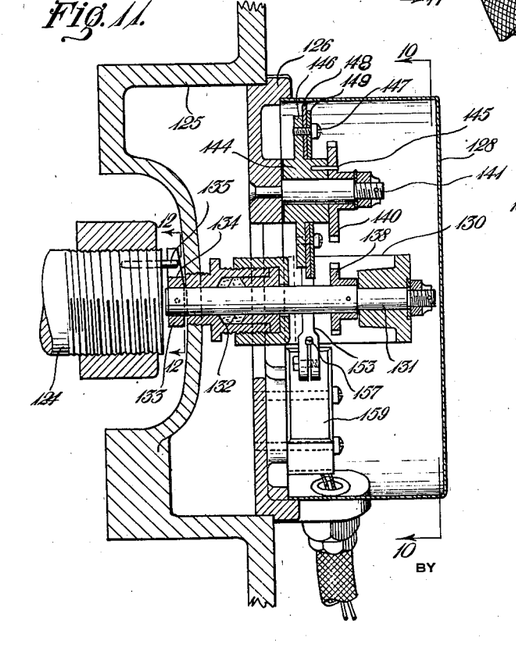
Figure 11 is a section thereof on the line 11—11 of Figure 10.
Figure 12:
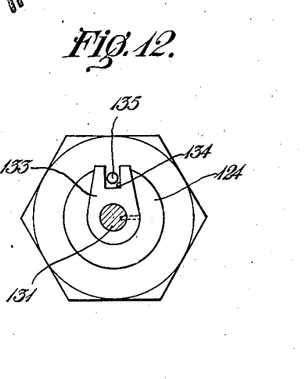
Figure 12 is a section on the line 12—12 of Figure 11.

Although the timer switch may be mounted at any convenient place on the tractor, satisfactory results have been obtained when it has been mounted upon the propeller shaft housing, in engagement with the end of the propeller shaft and it is so illustrated in Figures 10 to 12 of the drawings to which attention now is directed. As shown in Figure 11, 124 is the rear end of the propeller shaft of the tractor, and 125 is a portion of the housing enclosing the same. Mounted upon the exterior of the housing 125, in axial alignment with the shaft 124, is a timer casing comprising a base casting 126 that is secured to the housing 125 by bolts 127, 127, and a removable sheet metal cover 128 of circular shape that is secured to base 126 by set screws 129, 129. Diametrically spanning the base casting 126 is a bridge-like bearing structure 130 that constitutes an end bearing for the outer end of an axial shaft 131, the inner end portion thereof extending through a stuffing box, designated as a whole by the numeral 132, which stuffing box is carried by the housing 125. The inner end portion of shaft 131 is disposed within the housing 125 and is provided with a short crank 133 that is radially slotted at 134 to receive a crank pin 135 that is mounted in the end of the propeller shaft 124, eccentrically of the axis thereof. The arrangement is such that rotation of propeller shaft 124 drives the shaft 131, in counter-clockwise direction as viewed in Figure 10.

Mounted upon shaft 131, below bearing structure 130, is a gear 138 that is meshed with an idler pinion 139, the latter being meshed with a gear 140 that is journaled upon a stub shaft 141 that projects from the base casting 126 in which it is secured. The idler pinion 139 is journaled at the free end of a supporting arm 142 that is bolted to the base casting 126, said bolts extending through respective longitudinally disposed slots 143 in the arm to enable adjustment thereof. The arrangement enables the changing of gears 138, 140 to obtain the desired speed reduction therebetween. Also journaled upon the stub shaft 141, behind gear 140, is a cam hub 144 that has driving connection with said gear through the agency of a pin 145. The cam hub 144 is formed with a circumferential radial flange 146 to which is secured by means of set screws 147, 147, a fixed disc cam 148 and an adjustable disc cam 149, the latter being formed with arcuate slots 150, 150 through which the screws 147 extend, thereby enabling cam 149 to be adjusted angularly relatively of cam 148. The peripheral cam surfaces of the cams 148, 149 are identical, each comprising an elevated region of 300° extent and a lower or depressed region of 60° extent. By adjusting cam 149 angularly relatively of cam 148 the linear extent of said depressed region may be reduced, as is clearly shown in Figure 10.

Engaging the perimeter of the cams 148, 149 is a cam roller 152 that is journaled in one end of a cam lever 153 that is journaled at an intermediate point 154 upon the base casting 126. A tension spring 155 connected to the cam lever and to a fixed point 156 on the base casting normally yieldingly urges the cam lever in the direction that holds the cam roller 152 against the cams. The other end of the cam lever is provided with an adjustable screw 157 that is engageable with the push button 158 of an electrical switch 159, Figure 13, that is in the electrical circuit of the magnetic clutch 105, the battery 98 also being in said circuit. The switch 159 is enclosed in a suitable, switch-box 160 mounted upon the base casting 126 of the timer device. Said switch is so constructed that it closes the electrical circuit to the clutch 105, thus actuating or engaging the elements of the latter, when the cam roller 152 is on the elevated region of the cams 148, 149 as shown in Figure 10, and opening to effect the disengaging of the elements of said clutch when the cam roller is on the depressed region of the cam, as shown in Figure 13.

In the operation of the embodiment of the device illustrated, tires 17 to be tested for slippage are mounted upon the tractor 15, and a control tire, preferably of the same diameter, is mounted in the trailing frame 20. The switch 49 is closed to set the chart motor 42 in motion, to effect longitudinal movement of the chart 55. Switch 159 is normally closed, thus closing the magnetic clutch 105 and causing indicator finger 113 to move downwardly whenever the synchronous motor 96 is in motion. When making a test, the tractor 15 is driven forwardly, thus drawing the trailer after it and thus causing rotation of trailing wheel 21 with tire 22 thereon. As soon as the tractor is in motion, the rotary converter 97 is put into operation to effect the driving of the synchronous motors 37 and 96, the rotors of said motors maintaining the same geometric position at all times. For this reason the downward movement of the indicator finger always will bear the same determinate relation to the angular position of the wheel 21 notwithstanding the variations of speed to which the latter may be subject. The drive of the tractor effects the rotation of the cams 148, 149 and thereby effects periodic opening of the switch 159, satisfactory results having been obtained when the cams are driven at such speed as to make one revolution every two seconds. Opening of switch 159 de-energizes magnetic clutch 105 thereby disengaging the shaft 106 from drive shaft 103, thereby enabling spring 120 to return the indicator finger 113 to a determinate elevated position. Thus it will be seen that the pen 114 on the end of finger 113 will scribe a curve on the moving chart 55, and that the finger will oscillate, that is, move up and down at a frequency that is in direct ratio to the speed of rotation of the driven wheel 21. The instrument is so regulated that the finger may have maximum amplitude of movement within the lateral margins of the chart 55. Maximum amplitude of movement of the finger 113 is possible only when there is no slippage between the tires 17 and the roadway, for such slippage accelerates the rotation of the cams 148, 149 and thus causes the finger 113 to rise before reaching the extremity of its downward movement, the curve scribed by the pen 114 being thereby modulated. By comparing the envelope of the modulated curve with a curve scribed by the indicator finger moving at maximum amplitude, the percentage of slippage of the tires 17 may be computed.

The slippage data thus obtained, to be acceptable as an accurate indication of the tractive characteristics of tires, must be considered in connection with other factors that influence slippage. Thus load drawn by the tractor must be uniform and constant, and the speed of the tractor also must be considered. Apparatus for maintaining a determinate and constant pull on the drawbar of the tractor, and for indicating the speed thereof are provided, but such apparatus is no part of the present invention and needs no further disclosure herein.

The recording instrument shown at 155 of the drawings is operated by the engine of the tractor and forms no part of the present invention.

The invention is automatic in its operation, it provides a graphic record of the slippage of the tractor wheels, and achieves the other objects set out in the foregoing statement of objects.

Modification may be resorted to without departing from the spirit of the invention, or the scope thereof as defined by the appended claims.

What is claimed is:

1. In a device for recording slippage between the driving wheels of a vehicle and a roadway, the combination of an indicating mechanism comprising a continuous, moving recording chart and a recording finger movable thereover, a driven wheel connected to the vehicle and rotated by being drawn over the roadway, means for moving the recording finger over the chart in one direction at a speed proportional to the speed of rotation of said wheel, and means controlled by the rotation of the driving wheels of the vehicle operating periodically to limit the amplitude of movement of said recording finger and to return the finger to point of starting.

2. In a device for recording slippage between the driving wheels of a vehicle and a roadway, the combination of an indicating mechanism comprising a continuous, moving chart and a recording finger movable thereover, a driven wheel connected to the vehicle and rotated by being drawn over the roadway, means operatively connecting the driven wheel with the recording finger for impelling the latter over the chart in one direction, and means controlled by the rotation of the driving wheels for periodically disconnecting the indicating finger from said impelling means whereby the amplitude of movement of the recording finger is proportional to the relative rotation between the driving and driven wheels.

3. In a device for recording slippage between the driving wheels of a vehicle and a roadway, the combination of an indicating mechanism comprising a continuous, moving chart and a recording finger movable thereover, a driven wheel connected to the vehicle and rotated by being drawn over the roadway, means operatively connecting the driven wheel with the recording finger for impelling the latter over the chart in one direction, yielding means opposing said movement of the recording finger, and means controlled by the rotation of the driving wheels of the vehicle for periodically disengaging the indicating finger from said impelling means to enable the yielding means to return the finger to original position whereby the amplitude of movement of the recording finger is proportional to the relative rotation between the driving and driven wheels.

4. In a device for recording slippage between the driving wheels of a vehicle and a roadway, the combination of an indicating mechanism comprising a continuous, moving chart and a recording finger movable thereover, a driven wheel connected to the vehicle and rotated by friction of the roadway, means operatively interposed between the driven wheel and the recording finger for impelling the latter over the chart in one direction, said means comprising a releasable connection, and means controlled by the rotation of the driving wheels of the vehicle for periodically releasing said connection as a means of modulating the amplitude of movement of said recording finger, the said amplitude of movement being proportional to the slippage between the driving wheels and the roadway.

5. In a device for recording slippage between the driving wheels of a vehicle and a roadway, the combination of an indicating mechanism comprising a moving chart and a recording finger movable thereover, a driven wheel connected to the vehicle and rotated by friction of the roadway, means operatively interposed between the driven wheel and the recording finger for impelling the latter over the chart in one direction, said means comprising a normally energized magnetic clutch, and means controlled by the rotation of the driving wheels of the vehicle for periodically de-energizing said clutch to disengage said finger from its impelling means, thereby modulating the amplitude of movement of said finger under impetus of said impelling means, the said amplitude of movement being proportional to the slippage between the driving wheels and the roadway.

6. A combination as defined in claim 5, including spring means opposing the impelling movement of the recording finger, and returning the latter to point of starting when the clutch is de-energized.

7. In a device for recording slippage between the driving wheels of a vehicle and a roadway, the combination of an indicating mechanism comprising a continuous, moving chart and a recording finger movable thereon, a driven wheel connected to the vehicle and rotated by friction of the roadway, a pair of self synchronizing electric motors operatively connected with said driven wheel and recording finger respectively for impelling said recording finger in one direction in determinate relation to the rotation of said wheel, and means controlled by the rotation of the driving wheels for periodically disengaging said recording finger from its impelling means whereby the amplitude of movement of the recording finger is proportional to the slippage between the driving wheels and the roadway.

8. In a device for recording slippage between the driving wheels of a vehicle and a roadway, the combination of an indicating mechanism comprising a continuous, moving chart and a recording finger movable thereover, a driven wheel connected to the vehicle and rotated by friction of the roadway, a pair of self synchronizing electric motors operatively connected with said driven wheel and said recording finger respectively for impelling said recording finger in one direction in determinate relation to the rotation of said wheel, yielding means operating in opposition to said movement of the recording finger, and means controlled by the rotation of the driving wheels for periodically disengaging said recording finger from its impelling means, thereby enabling said yielding means to retract said recording finger, whereby the amplitude of movement of the recording finger is proportional to the slippage between the driving wheels and the roadway.

9. In a device for recording slippage between the driving wheels of a vehicle and a roadway, the combination of an indicating mechanism comprising a continuous, moving chart and a recording finger movable thereover, a driven wheel connected to the vehicle and rotated by friction of the roadway, a pair of self synchronizing electric motors operatively connected with said driven wheel and said recording finger respectively for impelling said recording finger in one direction in determinate relation to the rotation of said wheel, a normally energized magnetic clutch in the finger-impelling mechanism, a switch controlling the operation of said magnetic clutch, and means operated by the propelling mechanism of the vehicle for periodically operating said switch, whereby the amplitude of movement of the recording finger is proportional to the relative rotation of the driving and driven wheels.

10. A device for recording relative movement between a movable driving member and a movable driven member caused to move due to movement of said driving member, said device comprising said driven member, a chart, a recording finger movable transversely of said chart, means controlled by movement of one of said members for moving the finger across the chart in one direction, and means controlled by the other member for terminating the said movement of the recording finger and returning it to its point of starting after said one member has moved a determinate extent whereby variation in the amplitude of movement of the recording finger is proportional to the relative movement of said members.

11. A device for recording relative rotation between a rotatable driving member and a rotatable driven member caused to rotate due to rotation of said driving member, said device comprising said driven member, a movable chart, a recording finger movable transversely of said chart, means controlled by the rotation of one of said members for moving the finger across said chart in one direction and means controlled by the other member for terminating the said movement of the recording finger and returning it to its point of starting intermittently as said other member makes a determinate number of revolutions, whereby variation in the amplitude of movement of the recording finger is proportional to the relative rotation between said members.

GEORGE P. BOSOMWORTH.